United States Patent [19]

Kanamori et al.

[11] Patent Number: 4,608,361

[45] Date of Patent: Aug. 26, 1986

[54] CATALYST CARRIERS AND PROCESS FOR PREPARATION OF THE SAME

[75] Inventors: Nobutaka Kanamori, Tokyo; Masaji Kurosawa, Chiba, both of Japan

[73] Assignees: Nichias Corporation; Honshu Paper Mfg. Co., Ltd., both of Tokyo; Sakai Chemical Industry Co., Ltd., Osaka, all of Japan

[21] Appl. No.: 559,310

[22] Filed: Dec. 8, 1983

Related U.S. Application Data

[63] Continuation of Ser. No. 248,027, Mar. 26, 1981, abandoned.

[30] Foreign Application Priority Data

Mar. 26, 1980 [JP] Japan .................................. 55-37495

[51] Int. Cl.$^4$ .......................... B01J 32/00; B28B 1/50; D21F 11/02
[52] U.S. Cl. ..................................... 502/232; 162/146; 162/152; 162/181.6; 162/207; 264/44; 264/63; 264/136; 502/242; 502/263; 502/527
[58] Field of Search .......................... 264/44, 637, 136; 502/232, 242, 263, 527; 162/146, 152, 181.6, 207

[56] References Cited

U.S. PATENT DOCUMENTS

| | | | |
|---|---|---|---|
| 1,954,889 | 4/1934 | Parsons | 264/44 X |
| 3,199,992 | 8/1965 | Moffitt | 264/44 X |
| 3,686,006 | 8/1972 | Horton | 264/44 X |
| 3,899,555 | 8/1975 | Takao | 264/44 |
| 3,939,002 | 2/1976 | Washbourne | 264/44 |
| 4,280,926 | 7/1981 | Abe et al. | 502/242 X |
| 4,327,188 | 4/1982 | Endo et al. | 502/242 X |
| 4,416,800 | 11/1983 | Abe et al. | 502/242 X |
| 4,508,841 | 4/1985 | Onuma et al. | 502/263 X |

FOREIGN PATENT DOCUMENTS 47-13612 7/1972 Japan.

*Primary Examiner*—Philip Anderson
*Attorney, Agent, or Firm*—Birch, Stewart, Kolasch & Birch

[57] ABSTRACT

A process is disclosed for producing a sheet for a catalyst carrier for vapor-phase reactions which comprises mixing highly heat resistant ceramic fibers, organic fibers and an organic binder to form a slurry, forming the slurry into a paper sheet, impregnating the paper sheet with a silicon compound, converting the silicon compound to silica gel and heating the impregnated sheet to burn up the organic fibers and organic binder. The process produces an improved catalyst carrier for vapor-phase reactions having high porosity and good strength properties.

24 Claims, No Drawings

CATALYST CARRIERS AND PROCESS FOR PREPARATION OF THE SAME

This is a continuation of application Ser. No. 248,027, filed Mar. 26, 1981 now abandoned.

The present invention relates to a carrier adapted to support or bear thereon catalysts for vapor-phase chemical reactions, and also relates to a process for the preparation of such carriers.

Heretofore, a variety of articles such as extruded shapes of cordierite or mullite, asbestos paper and the like have found extensive use as catalyst carriers. However, they have disadvantages, as well as advantages, as far as durability, catalyst-supporting capability, and manipulation characteristics are concerned. This is especially so when certain types of catalyst carriers are employed under severe conditions, such as encountered in the treatment of nitrogen oxides, sulfur oxides, organic substance, and the like contained in the combustion off-gases. This results in a strong need for catalyst carriers which possess more improved capacities.

It is therefore an object of the present invention to provide a catalyst carrier with increased durability, catalyst-supporting capability, and manipulation characteristics. It is also an object of the present invention to provide a process for the preparation of these high performance catalyst carriers.

These and other objects and advantages of the present invention will appear more clearly from the following specification.

The catalyst carrier according to the present invention is characterized primarily by a sheet-like mass which is composed of ceramic fibers bonded by silica gel, and has a porosity of at least 75%. The term porosity used herein shall be taken to mean proper porosity. It is defined in terms of a value calculated from the following equation:

$$\text{Porosity} = \left(1 - \frac{\text{Apparent Density}}{\text{True Density}}\right) \times 100$$

The present invention also pertains to a process for the preparation of such carriers.

The carrier, according to the present invention, has a structure all its own. It is characterized primarily in that it comprises a sheet-like article, which has a markedly increased surface area per unit weight and has a high porosity, but which has satisfactory shape retention and high heat resistance.

The ceramic fibers that are used as a starting material for a sheet forming the carrier according to the present invention refer to highly heat-resistant inorganic fibers such as so-called silica fibers, alumina fibers, alumino silicate fibers, zirconia fibers, or the like. This starting material is readily available commercially, including for example, Fine Flex, manufactured by Nippon Asbestos Co., Ltd., and Refraseal, manufactured by HITCO, Inc.

Preferably, the ceramic fibers should amount to 80 to 96% of the toal weight of the sheets.

Silica gel is present on the points of contact with ceramic fibers on which it acts as a binder for bonding the fibers. Due to its high heat resistance and rigidity, this binder, acting together with the rigidity of ceramic fibers, improves the shape retention of the carrier of the present invention, even though it is applied in a relatively small amount.

For practical reasons, the thickness of each individual sheet, although not critical, is preferably in a range of 0.15 to 0.50 mm.

The shape of each individual sheet is also not critical, and the sheet may be formed into a desired shape of any size, for example, a perforated or imperforated flat plate or a corrugated (e.g., rectangular, sine curved or saw-toothed) plate. Additionally, the sheets may be laminated one upon another with air passages therebetween. Laminates having a structure suitable for the carrier include between their flat sheets and corrugated sheets tunnels or channels which provide passages through which the gas to be treated flows.

Until now, difficulties have been encountered in fabricating such a carrier, particularly those which are partially corrugated, directly from ceramic fibers. Surprisingly, however, it has been found that the carrier can easily be prepared by means of the process of the present invention as set forth hereinafter.

Paper is first made from a mixture of ceramic fibers with organic fibers and an organic binder.

The organic fibers are preferably cellulosic fibers such as rayon fibers, wood pulp etc., that are hydrophilic and well dispersible in water, but not thermoplastic. However, a variety of synthetic fibers such as those based on vinylon, acryl, polyester, and the like may also be used. It is desirable that the fibers used have a fineness of 3 deniers or less and a length of about 3 to 10 mm in view of dispersibility in water, paper strength, and other considerations.

The organic fibers play three roles in the process of the present invention. The first role is to improve the dispersion and, hence, the paper-making ability of rigid and self-adhering free ceramic fibers in synergic cooperation with the organic binder in the paper-making step. The remaining two roles will be discussed later.

The organic binder is used to promote dispersion of the fibers and make a bonding between the fibers to thereby increase paper strength. Fibrous polyvinyl alcohol resin is most preferable for this purpose since it gives rise to an increase in the yield of the paper-making process. However, acryl resins, vinyl acetate resins, ethylene-vinyl acetate resins, urea resins, melamine resins, carboxy-methylcellulose, dextrine (starch) or the like in the form of an aqueous solution, emulsion, powder, fibers or the like may also be employed.

In the paper-making step referred to above, the ceramic fibers, the organic fibers and the organic binder are used in quantities of 80-96 wt.%, 2-10 wt.% (preferably 3-6 wt. %), and 2-10 wt.% (preferably 3-6 wt. %), respectively. The greater the quantity of organic materials, the easier it is to form the raw materials prior to paper-making and firing (this will be discussed in more detail at a later time). Since there is then a tendency toward a lowering of the strength of the final article, however, it is desirable that the total amount of the organic materials be restricted to 15% or less.

In addition to the abovementioned raw materials, aids ordinarily employed in the preparation of sheets may also be used. Nonetheless, it is desirable to avoid the use of inorganic acids, expecially those containing an ingredient which remains and behaves as a catalyst poison in the final article.

When rayon fibers and wood pulp are used as the organic fibers, and an emulsion of vinyl acetate resin is used as the binder, the obtained paper possesses satisfactory shape retention upon molding, and can be corrugated in a wider range of temperatures and humidities.

In a known manner, the raw materials for paper-making are formed into a slurry having a concentration of 0.1 to 0.3%, and then into paper having a thickness of 0.15 to 0.50 mm and a density of 0.2 to 0.4 g/cm$^3$, calculated on dry basis, with the use of a Fourdrinier wire or cylinder type mold.

The resulting paper is then molded into a desired shape, which is suitable for use as a catalyst carrier. It will be noted that, when a flat carrier is prepared, such processing is omitted.

Processing of paper into a desired shape, if not accompanied by bonding, punching or bending, may be effected on the final product. However, a bending process, such as corrugating, should be effected in this step.

Corrugation may be performed so as to form flutes or corrugations having a given height and a given interspacing with the use of, for example, a paper corrugator machine.

The second role of the organic fibers in the process of the present invention is to improve the processability of the mass to be treated in the molding step, and the shape retention of the thus treated mass in a later processing step. In this connection, it is impossible to corrugate finely a sheet of paper composed of rigid ceramic fibers alone.

In addition to bending, molding performed in this step may involve bonding and other treatment for forming a three-dimensional shape. For example, corrugated sheets may alternate with untreated flat sheets through adhesives to prepare a product having a structure of three-dimensional shape. For this purpose, organic adhesives are unsuitable. Consequently, the bonding agent used should be inorganic and resistant to firing (this will be discussed later) in a temperature condition ranging from several hundreds to 1000° C. However, it is desirable to avoid the use of a bonding agent of the type containing an ingredient that provides catalyst poison, such as alkali metal ions. Examples of suitable adhesives are:

1. Refined bentonite which may or may not be added with titanium oxide, silica powder, alumina sol or the like;
2. Silica powder and alumina powder in combination;
3. Alumina powders and kaolin added with colloidal silica or ceramic fibers; and
4. Zirconia powders and colloidal silica in combination.

These adhesives are diluted with water for use. Commercially available are FF bonding agent, manufactured by Nippon Asbestos Co., Ltd., and Sumicerum, manufactured by Sumitomo Kagaku Kogyo K.K., etc.

The processed paper, or the paper which is formed into a flat sheet without any processing, is impregnated uniformly with colloidal silica or ethyl silicate, and the thus impregnated silicon compound is then converted to silica gel for later curing.

The colloidal silica-impregnated paper is dried at 150°–170° C. to complete its curing.

In the ethyl silicate-impregnated paper, the ethyl silicate is hydrolyzed to silica gel in the paper texture. To this end, a liquid, or solution, of ethyl silicate may be exposed to hot vapor upon curing. Alternatively, a solution of ethyl silicate may be added with hydrochloric acid as a catalyst, and then allowed to stand for several hours upon curing.

For impregnation, the ethyl silicate is preferable to the colloidal silica since uniform dispersion takes place more readily.

Either the ethyl silicate or the colloidal silica should preferably be impregnated in quantities of the order of 60 to 120 g per 100 g of paper, calculated as $SiO_2$. With excessive amounts of the impregnant, an increased strength is imparted to the final product which, on the other hand, suffers a reduction in porosity and, hence, available surface area, thus rendering it unsuitable for use as a catalyst carrier. It is thus desirable that a suitable amount of the impregnant be dispersed as uniformly as possible.

Upon the formation of silica gel, the paper is fired in order to burn up the organic fibers and binder, leaving a sheet composed of the ceramic fibers and the silica gel. This sheet retains the shape imparted in the aforesaid processing step, and possesses satisfactory strength and shape retention such as that ordinarily demanded for a catalyst carrier. In addition, the sheet has an available surface area much larger than that of a sheet which is similar in composition, has an identical density, and is prepared directly from ceramic fibers and a silica gel-forming binder, since the organic fibers and binder are burned up, leaving fine pores or irregularities. As will be understood from the foregoing, the third role of the organic fibers in the present invention is to form such fine pores in the last step.

The thus obtained sheet of cearmic fibers is used as such for a catalyst carrier. Alternatively, the sheet may be further processed or profiled to a size, shape or construction suitable for a given catalyst carrier in any known manner involving cutting, punching, rebonding etc.

As will be evident from the foregoing, the present invention makes it possible to readily prepare a catalyst carrier excelling in heat resitance and catalyst-supporting capability, which can be profiled or otherwise processed to a shape (e.g., a corrugated laminate); and formed even to a large-sized article (having a side of as long as one meter).

The carrier according to the present invention, which is basically composed of fibers, has an available surface area per unit weight far larger than that of a carrier consisting of an extruded ceramic material, so that not only does it take a smaller space in a reactor, but it is also light in weight and strongly resistant to thermal shocks. Compared with a carrier of asbestos paper, the carrier according to the present invention also greatly excels in heat resistance, durability, and catalyst-supporting capability, with no fear of catalyst deterioration by catalyst poison. Thus, the present invention has advantages over the prior art.

The present invention will now be described in detail with reference to the following non-restricting examples. In Table 1 (presented later), the buckling strength is given in terms of a value determined according to JIS Z 0401. The heat resistance is given in terms of a temperature at which a sample was heated for three hours to determine a value of the buckling strength amounting to 50% of the primary strength.

EXAMPLES 1–4

Fine Flex of alumina silica-based ceramic fibers (made by Nippon Asbestos Co., Ltd.) having a thickness of 2.6 to 3.0 microns and a length of 5 to 30 mm, rayon fibers (1.5d × 5 mm), and fibrous polyvinyl alcohol resin was dispersed in water in an amount 340 times that of the raw materials, and were formed into paper in a known manner by a cylindrical paper machine. The obtained paper was corrugated at 180° C. to form flutes or corrugations having a height of 2.2 mm. A mixed solution of 8.0 parts of ethyl silicate having a solid content of 40% silica, 13 parts of ethyl alcohol, 6 parts of water, and 1 part of 5% hydrochloric acid was blown onto the corrugated sheet in an amount of 100 g per 100 g of paper, calculated as $SiO_2$. The sheet was then allowed to stand for three hours in a wet atmosphere, and was dried. Thereupon, the sheet was fired at 800° C. in an oxidizing atmosphere to burn up the organic matter.

-continued

| | |
|---|---|
| Vinyl acetate resin (emulsion) | 5 |

The abovementioned raw materials were formulated into a catalyst carrier according to the procedures of Example 1. For the properties of the obtained carrier, see Table 1.

The present invention is, of course, in no way restricted to the specific disclosure of the specification, but also encompasses any modifications within the scope of the appended claims.

TABLE 1

| | | Examples | | | | | | | | | Comparative Examples | |
|---|---|---|---|---|---|---|---|---|---|---|---|---|
| | | 1 | 2 | 3 | 4 | 5 | 6 | 7 | 8 | 9 | 1 | 2 |
| Proportion of Raw Materials (%) | Ceramic Fibers | 90 | 94 | 91 | 88 | 88 | 82 | 86 | 88 | | 72 | 98 |
| | Rayon Fibers | 5 | 2 | 4 | 8 | 10 | 8 | 7 | 5 | | 15 | 1 |
| | Wood Pulp | | | | | | | | | 5 | | |
| | PVA | 5 | 4 | 5 | 4 | 2 | 10 | 7 | 2 | | 13 | 1 |
| Properties of Paper | Density (g/cm$^2$) | 0.271 | 0.263 | 0.272 | 0.282 | 0.282 | 0.341 | 0.323 | 0.282 | 0.286 | 0.352 | 0.261 |
| | Buckling Strength (kg/cm$^2$) | 0.14 | 0.04 | 0.14 | 0.3 | 0.3 | 0.6 | 0.5 | 0.4 | 0.45 | 1.0 | — |
| | Weight (g/m$^2$) | 58.3 | 59.1 | 59.2 | 56.2 | 56.2 | 58.9 | 58.8 | 56.2 | 59.5 | 58.9 | 60.1 |
| | Thickness (mm) | 0.215 | 0.225 | 0.218 | 0.199 | 0.173 | 0.182 | 0.167 | 0.199 | 0.208 | 0.167 | 0.230 |
| | Shape Retention | ○ | ○ | ○ | ○ | ○ | ○ | ○ | ◉ | ◉ | | |
| Properties of Carrier | Density (g/cm$^2$) | 0.13 | 0.13 | 0.13 | 0.13 | 0.13 | 0.12 | 0.13 | 0.13 | 0.13 | 0.10 | — |
| | Buckling Strength (kg/cm$^2$) | 2.0 | 2.5 | 2.0 | 1.5 | 1.5 | 1.0 | 1.1 | 1.8 | 2.0 | 0.1 | — |
| | Porosity (%) | 77.2 | 75.7 | 77.0 | 77.2 | 77.0 | 78.1 | 79.3 | 80.0 | 82.8 | — | — |
| | Heat Resistance (°C.) | 850 | 850 | 850 | 800 | 800 | 600 | 700 | 800 | 800 | 400 | — |

Note:
A mark ○ indicates that no high and low phenomenon takes place at a normal corrugating speed.
A mark ◉ indicates that no high and low phenomenon takes place even at a higher corrugating speed.

Table 1 shows the properties of the catalyst carriers made of ceramic fiber sheets prepared in varied proportions of the raw materials and corrugated sheets prior to firing.

EXAMPLES 5 and 6

The same raw materials as those in Examples 1–4 were treated under the identical conditions, except that polypropylene fibers (1.5d×5 mm) were substituted for the rayon fibers. For the properties of the obtained catalyst carriers made of ceramic fiber sheets, refer to Table 1.

EXAMPLES 7 and 8

The same raw materials as those in Examples 1–4 were treated under the identical conditions, except that a mixture of rayon fibers (3d×7 mm) and beaten wood pulp was employed as the organic fibers. For the properties of the obtained catalyst carriers made of ceramic fiber sheets, refer to Table 1.

COMPARISON EXAMPLES 1 and 2

Similar sheets were prepared according to Examples 1–4, except that the proportions of rayon fibers and polyvinyl alcohol resin applied were beyond the range of the present invention. The results are set forth in Table 1.

EXAMPLE 9

| | |
|---|---|
| Fine Flex | 85 |
| Rayon fiber (1.5 d × 5 mm) | 5 |
| Beaten wood pulp | 5 |

What is claimed is:

1. A process for producing a sheet for a catalyst carrier for vapor-phase reactions, which comprises in combination the steps of:
   mixing ceramic fibers, organic fibers, and an organic binder to form a slurry;
   forming said slurry into a sheet of paper having a density of 0.2 to 0.4 gram per cubic centimeter;
   impregnating said sheet of paper with a silicon compound selected from the group consisting of colloidal silica and ethyl silicate;
   converting said silicon compound to silica gel by drying; and
   heating said impregnated sheet at a temperature of up to about 1,000° C. to burn up said organic fibers and said organic binder.

2. A process for producing a sheet for a catalyst carrier according to claim 1, wherein said organic binder is a fibrous polyvinyl alcohol.

3. A process for producing a sheet for a catalyst carrier according to claim 1, wherein said organic fibers are rayon fibers or beaten wood pulp, and said organic binder is an emulsion of vinyl acetate resin.

4. A process for producing a sheet for a catalyst carrier according to claim 1, wherein said ceramic fibers comprise highly heat resistant silica fibers, alumina fibers, alumino silicate fibers or zirconia fibers.

5. A process as in claim 4, wherein said ceramic fibers have a thickness of about 2.6 to 3.0 microns and a length of about 5 to 30 mm.

6. A process for producing a sheet for a catalyst carrier according to claim 1, wherein said silicon compound is impregnated in an amount of about 60 to 120 g/100 g of said sheet of paper, calculated as $SiO_2$.

7. A process as in claim 1, wherein said heating temperature is about 800° C.

8. A process as in claim 1, wherein said organic fibers are mixed in an amount of not greater than about 15% by weight.

9. A process as in claim 1, wherein said slurry comprises 80 to 96% by weight of said ceramic fibers, 2 to 10% by weight of said organic fibers, and 2 to 10% by weight of said organic binder.

10. A process as in claim 1, wherein prior to said impregnating step said sheet of paper is corrugated to form flutes or corrugations.

11. A process according to claim 1, wherein after said heating step, a plurality of the produced sheets are formed into a catalyst carrier.

12. A process for producing a sheet for a catalyst carrier for vapor-phase reactions, which comprises:
   mixing ceramic fibers comprising highly heat resistant silica fibers, alumina fibers, alumino silicate fibers or zironia fibers, organic fibers in an amount of not greater than about 15% by weight, and an organic binder to form a slurry;
   forming said slurry into a sheet of paper having a density of 0.2 to 0.4 g/cm³;
   impregnating said sheet of paper with a silicon compound comprising colloidal silica or ethyl silicate;
   converting said silicon compound to silica gel by drying; and
   heating said impregnated sheet at a temperature of up to about 1,000° C. to burn up said organic fibers and said organic binder.

13. A process as in claim 12, wherein said slurry comprises 80 to 90% by weight of said ceramic fibers, 2 to 10% by weight of said organic fibers, and 2 to 10% by weight of said organic binders.

14. A process according to claim 12, wherein after said heating step, a plurality of the produced sheets are formed into a catalyst carrier.

15. A sheet for a catalyst carrier produced by a process according to claim 1.

16. A sheet for a catalyst carrier produced by a process according to claim 4.

17. A sheet for a catalyst carrier produced by a process according to claim 3.

18. A sheet for a catalyst carrier produced by a process according to claim 12.

19. A sheet for a catalyst carrier produced by a process according to claim 13.

20. A catalyst carrier for vapor-phase reactions comprising a sheet-like mass of ceramic fibers being bonded by silica gel and said catalyst carrier having a porosity of at least 75%.

21. A catalyst carrier as in claim 20, wherein said ceramic fibers comprise highly heat resistant silica fibers, alumina fibers, alumino silicate fibers or zirconia fibers.

22. A catalyst carrier as in claim 21, wherein said ceramic fibers having a thickness of about 2.6 to 3.0 microns and a length of about 5 to 30 mm.

23. A catalyst carrier produced by a process according to claim 11.

24. A catalyst carrier produced by a process according to claim 14.

* * * * *